United States Patent

Simmons

(10) Patent No.: US 8,061,923 B2
(45) Date of Patent: Nov. 22, 2011

(54) BLIND MOTORIZED COUPLING ARRANGEMENTS FOR COUPLING UV LIGHT SOURCE SUBSYSTEM AND SCANNER SUBSYSTEM IN A UV LITHOGRAPHY SYSTEM AND METHODS THEREFOR

(75) Inventor: Rodney D. Simmons, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 603 days.

(21) Appl. No.: 12/210,086

(22) Filed: Sep. 12, 2008

(65) Prior Publication Data

US 2010/0067983 A1   Mar. 18, 2010

(51) Int. Cl.
*F16B 21/02* (2006.01)
(52) U.S. Cl. .......... 403/348; 403/350; 355/67; 362/649
(58) Field of Classification Search .............. 403/348, 403/350, 349; 362/649, 650, 651, 217.13, 362/217.17; 250/492.1, 492.2, 504 R; 355/67
See application file for complete search history.

(56) References Cited

U.S. PATENT DOCUMENTS

| | | | | |
|---|---|---|---|---|
| 4,486,918 A * | 12/1984 | Peebles | ......................... | 16/422 |
| 4,990,022 A * | 2/1991 | Watanabe et al. | ............. | 403/349 |
| 7,264,391 B2 * | 9/2007 | Kaandorp | ..................... | 362/649 |
| 7,603,059 B2 * | 10/2009 | Marumoto | ..................... | 403/348 |
| 7,641,517 B2 * | 1/2010 | Vogt et al. | ..................... | 362/651 |
| 2002/0110388 A1 * | 8/2002 | Yokomori et al. | ............. | 399/167 |

FOREIGN PATENT DOCUMENTS

GB   2 187 820   * 9/1987

* cited by examiner

*Primary Examiner* — Michael P Ferguson
(74) *Attorney, Agent, or Firm* — Joseph Nguyen

(57) ABSTRACT

A coupling arrangement for coupling a light source subsystem with a scanner subsystem in a UV lithography system is disclosed. The arrangement includes a source flange having a plurality of ramped eared flanges coupled to one of the light source subsystem and the scanner subsystem. The arrangement also includes a collar coupled with the other of the light source subsystem and the scanner subsystem. The collar has a plurality of tangs disposed such that inter-tang spacings accommodate insertion of the plurality of eared flanges, wherein at least one of the source flange and the collar is rotatable to permit the plurality of ramped eared flanges to cam against the plurality of tangs, thereby coupling the light source subsystems to the scanner subsystem.

13 Claims, 4 Drawing Sheets

BLIND MOTORIZED COUPLING ARRANGEMENTS FOR COUPLING UV LIGHT SOURCE SUBSYSTEM AND SCANNER SUBSYSTEM IN A UV LITHOGRAPHY SYSTEM AND METHODS THEREFOR

BACKGROUND OF THE INVENTION

Ultraviolet (UV) lithography systems have long been employed to manufacture integrated circuits (ICs). Generally speaking, a UV lithography system may include at least two main subsystems: a light source subsystem designed to generate the UV light (which may be of any suitable wavelength, including wavelengths that are in the deep UV or extreme UV regions) and a scanner subsystem designed to imprint a pattern onto the photoresist using the UV light generated by the light source subsystem. Other subsystems are also furnished with a typical UV lithography system. However, they are not relevant to the present invention and will not be discussed in details herein.

Generally speaking, the two UV lithography subsystems (i.e., light source subsystem and scanner subsystems) tend to be designed as separate subs stems to facilitate ease of manufacturing and assembly and maintenance. During system final assembly, these two subsystems are coupled together to enable the scanner subsystem to utilize the UV light generated by the light source subsystem for lithography purposes.

As UV lithography systems become more complicated, and lithography system physical footprint and other requirements become more stringent, manufacturers continually look for ways to improve system quality, system manufacturability and ease of assembly. In the prior art, the alignment and coupling of the light source subsystem and the scanner subsystem tends to be a manual process that requires manual alignment and manual coupling (using for example appropriate fastening tools and fasteners) be highly skilled technicians. Because manual alignment and manipulation is involved, space is typically engineered into the interface area to accommodate the hands of the assembling technician as well as to accommodate fastening tool access. The space allotment for manual access increases the system footprint and in some cases, complicates UV lithography system design, particularly as UV lithography systems become more complex. In other cases, such space allotment is not possible due to the presence of other hardware components in the vicinity.

Furthermore, the quality of the alignment and coupling, as well as the efficiency with which the coupling is accomplished, tends to vary according to the skill level of the technician. The interface is nevertheless critical because of the need for precise alignment of the light beam with the scanner mechanisms and the need to maintain a vacuum seal during operation. With human involvement in the coupling process, however, there tends to be variability with respect to the quality of the assembled lithography systems, which increases the possibility for system defect and complicates trouble shooting and maintenance.

In view of the foregoing, improved arrangements and methods for coupling a UV light source subsystem to a UV scanner of a UV lithography system is desired.

SUMMARY OF INVENTION

The invention relates, in an embodiment, to a coupling arrangement for coupling a light source subsystem with a scanner subsystem in a UV lithography system. The arrangement includes a source flange having a plurality of ramped eared flanges coupled to one of the light source subsystem and the scanner subsystem. The arrangement also includes a collar coupled with the other of the light source subsystem and the scanner subsystem. The collar has a plurality of tangs disposed such that inter-tang spacings accommodate insertion of the plurality of eared flanges, wherein at least one of the source flange and the collar is rotatable to permit the plurality of ramped eared flanges to cam against the plurality of tangs, thereby coupling the light source subsystems to the scanner subsystem.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
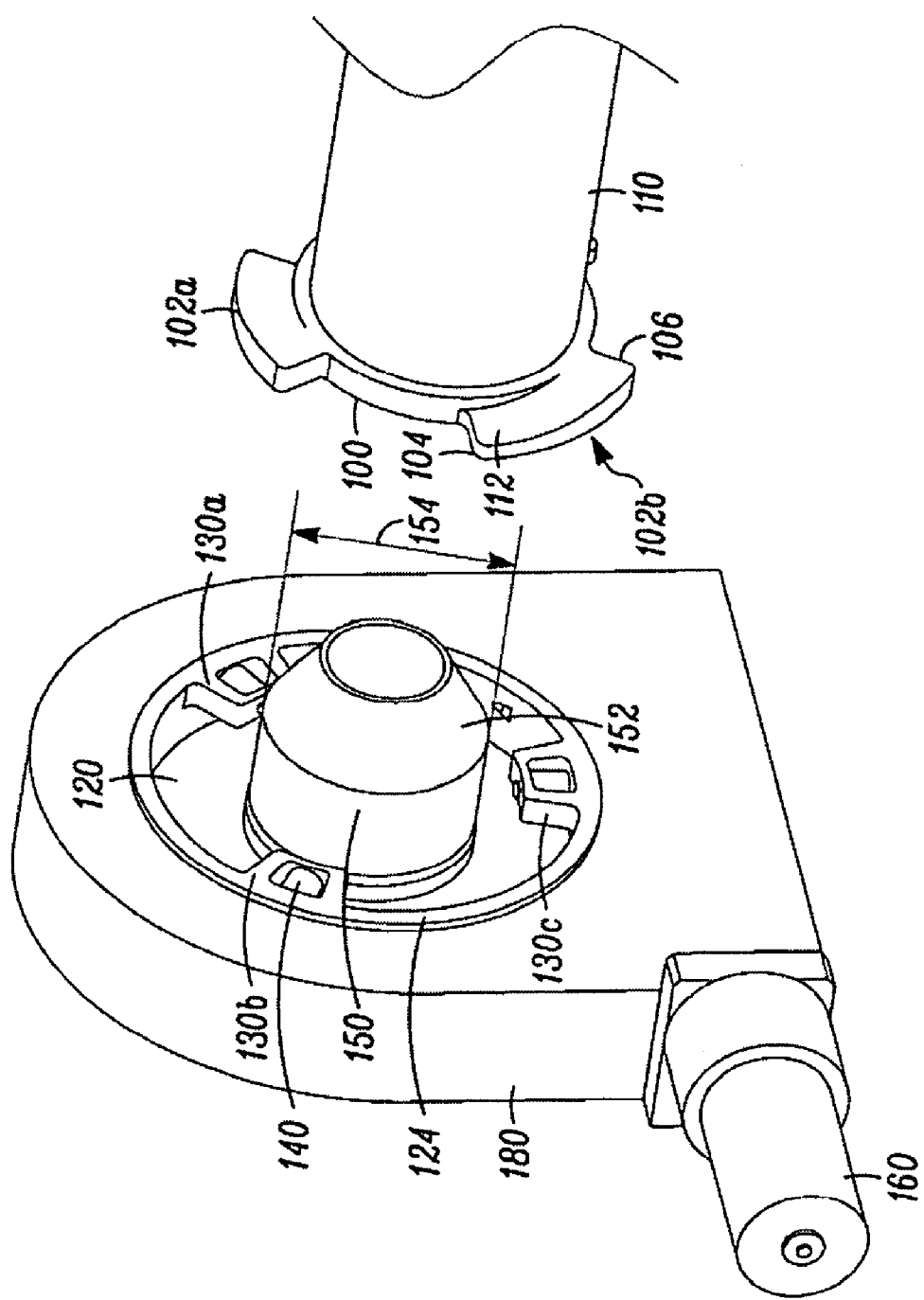
FIG. 1 shows, in accordance with an embodiment of the invention, a motorized blind coupling arrangement

The present invention will now be described in detail with reference to a few embodiments thereof as illustrated in the accompanying drawings. In the following description, numerous specific details are set forth in order to provide a thorough understanding of the present invention. It will be apparent however, to one skilled in the art, that the present invention may be practiced without some or all of these specific details. In other instances, well known process steps and/or structures have not been described in detail in order to avoid unnecessarily obscuring the present invention.

Embodiments of the invention relate to blind motorized coupling arrangements in which the light source subsystem of a UV lithography system can be coupled with the scanner subsystem without the need for manual alignment and manual access. In one or more embodiments, the blind motorized coupling arrangement includes a source flange having a plurality of eared flanges and a rotating collar having tangs sympathetic to the spacing between the eared flanges of the source flange to allow mating of the two subsystems. For ease or discussion, the implementation discussed herein will have the plurality of eared flanges disposed on the light source subsystem and the rotating collar disposed on the scanner subsystem although one skilled in the art will appreciate that a UV lithography system constructed in accordance with the teachings of the present disclosure may also have the plurality of eared flanges (and associated components as will be discussed herein) disposed on the scanner subsystem and the rotating collar (and associated components as will be discussed herein) disposed on the light source subsystem.

In one or more embodiments, a face seal surface is provided on a surface of the light source subsystem that faces the scanner subsystem. On the scanner subsystem side, a mating seal surface is provided on the surface that faces the light source subsystem. When the two subsystems are assembled and urged together by the aforementioned eared flanges and tangs of the rotating collar, the face seal surface of the light source subsystem is mated against the mating seal surface of the scanner subsystem.

To urge the two subsystems together, the ears of the plurality of eared flanges are ramped. When the rotating collar mates with the plurality of eared flanges, the ramps of the eared flanges push against the tangs of the rotating collar when the rotating collar is rotated. The ramping surfaces of the eared flanges thus provide a camming action that urges the face seal surface of the light source subsystem against the mating seal surface of the scanner subsystem to facilitate the desired coupling.

Preferably, the rotating collar is rotated using a motor that provides the rotational force to the rotating collar via an appropriate gear assembly (such as a worm gear/worm drive/servo combination, for example). In some embodiments, the gear assembly permits the motor to be disposed some distance away from the interface region itself, which simplifies the design of the interface region, particular if there are other hardware components that need to be disposed near the interface region. The use of the motor eliminates the need for manual access to the interface region.

In one or more embodiments, to maintain a vacuum seal, one or both of the face seal surface of the light source subsystem and the mating seal surface of the scanner subsystem may be equipped with one or more o-rings. The o-ring may be retained, in one or more embodiments, and may be elastomeric or metallic in nature. When the face seal surface of the light source subsystem is urged against the mating seal surface of the scanner subsystem by the aforementioned camming action, the retained o-ring(s) create and maintain the desired vacuum seal.

In one or more embodiments, to facilitate alignment of the two subsystems for assembly purposes, the scanner subsystem is provided with a lead-in stub that is designed to linearly and/or angularly align the two subsystems when the lead-in stub is disposed in a corresponding recess in the light source subsystem. The lead-in stub thus provides blind-mate self-centering when the two subsystems are cammed together.

In one or more embodiments, the tangs of the rotating collar are equipped with bearings (such as tapered needle bearings, for example) to allow the ramped surfaces of the plurality of eared flanges to ride on the bearings when the ramped surfaces of the plurality of eared flanges are cammed against the tangs. By using a rolling motion during camming, friction and debris generation are reduced.

The features and advantages of the invention may be better understood with reference to the figures and discussion that follow.

FIG. 1 shows, in accordance with an embodiment of the invention, a motorized blind coupling arrangement that includes a light source mating flange 100 having a plurality of eared flanges (there are three such eared flanges in the example of FIG. 1, of which two eared flanges 102a and 102b are shown in FIG. 1). The eared flanges have tapered ramp surfaces such that the thickness of one end of an eared flange (such as end 104 of eared flange 102b) is thinner than the other end of the eared flange (such as end 106 of eared flange 102b). In the example of FIG. 1, light source mating flange 100 and the plurality of eared flanges (102a/102b) are disposed on a light source output tube 110.

Figure 2:
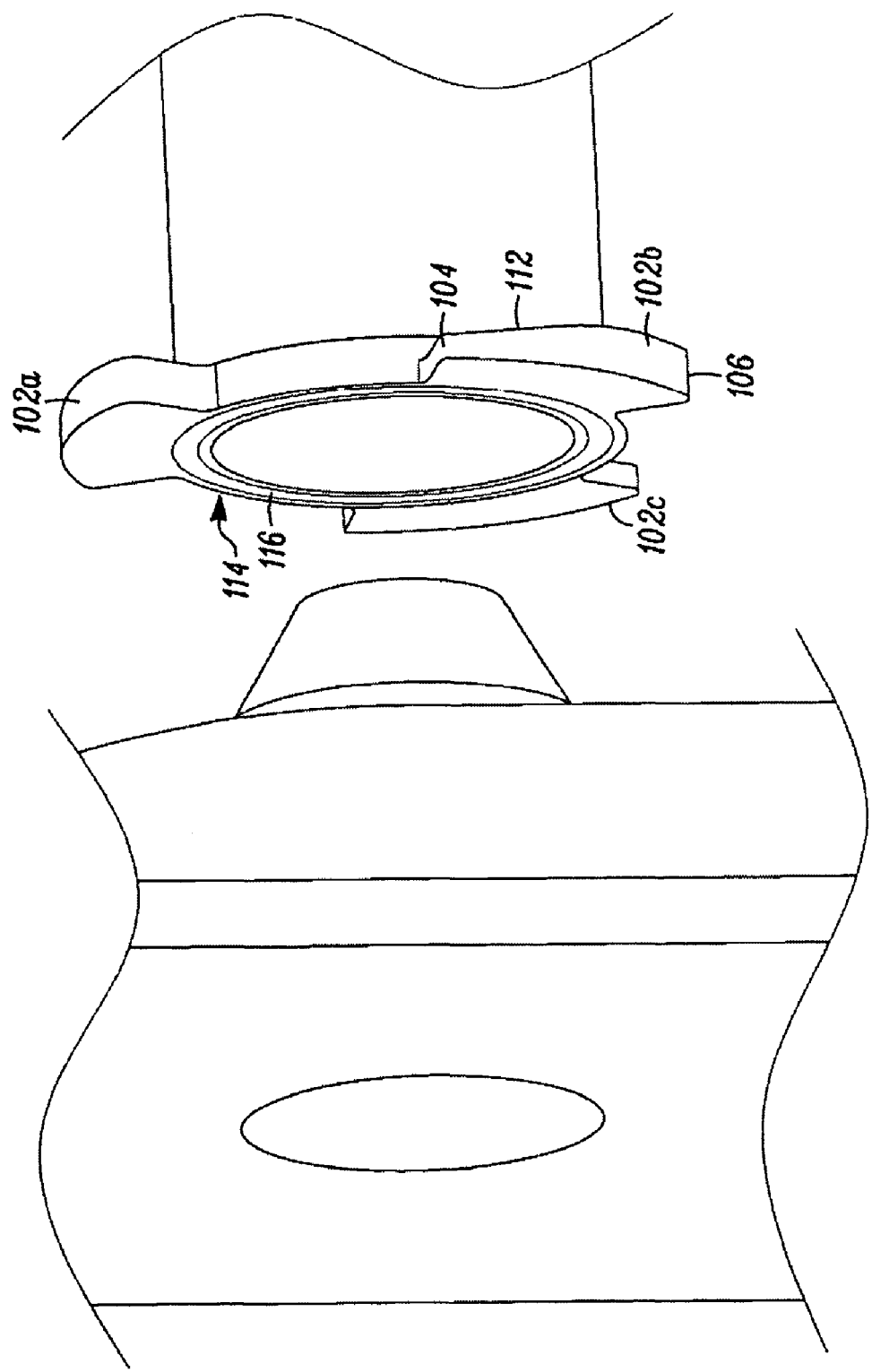
FIG. 2 shows, in accordance with an embodiment of the invention, another view of the motorized blind coupling arrangement

The three eared flanges (102a, 102b, and 102c) are shown more clearly in FIG. 2. With reference to FIG. 2, the tapered ramp feature of each eared flange is also seen. For example, eared flange 102b is shown with a tapered ramp surface 112, which is created by the difference in thickness between end 104 and 106. Light source output tube 100 includes a scanner-facing surface 114, a portion of which forms a light source face seal surface 116. Light source face seal surface 116 may be equipped with a retained O-ring, which may be formed of an elastomer material or a metallic material designed for vacuum sealing when light source face seal surface 116 mates against scanner mating seal surface 120 (best seen in FIG. 1).

A rotating collar 124 is shown in FIG. 1. Rotating collar 124 includes a plurality of tangs 130a, 130b, and 130c. The spacing between adjacent ones of tangs 130a, 130b, and 130c is designed to be sufficiently large so as to allowed an eared flange (such as eared flange 102b) to be inserted into this inter-tang region (such as the inter-tang region between tangs 130b and 130c). Once the eared flanges are inserted into the inter-tang regions past the tangs, rotating collar 124 is rotated to allow the tapered ramp surfaces of the eared flanges to be urged against the tangs, thereby urging light source face seal surface 116 (see FIG. 2) against scanner mating seal surface 120 (see FIG. 1). In the example of FIG. 1, the rotation of rotating collar 124 is in the clockwise direction to urge tapered ramp surface 112 against, for example, tang 130b.

To reduce friction and debris generation, the tangs (e.g., 130b) are provided with bearings to allow the camming action of the tapered ramp surface against the tangs to be accomplished using a rolling motion as rotating collar 124 is rotated. In the example of FIG. 1, the bearings are tapered needle bearings (such as tapered needle bearing 140) although other suitable types of bearing may be employed. To simplify assembly and/or to provide adequate load capacity and/or to reduce space, the bearings may be caged as shown in one or more embodiments.

To provide a self-centering capability during the alignment and coupling process, the scanner subsystem is provided with a tapered lead-in stub 150. In the example of FIG. 1, the tapered lead-in stub has a tapered cone section 152 designed to fit inside light source output tube 110. The sloping surface of the cone provides linear and/or angular self-centering of tapered lead-in stub 150 with respect to light source output tube 110. Outer diameter 154 of tapered lead-in stub 150 is preferably dimensioned to snugly fit the inner diameter of light source output tube 110 to further accomplish the self-centering.

A motor 160 is shown in FIG. 1, representing the motor employed to rotate rotating collar 124 to accomplish the coupling. Motor 160 is preferable an electric servo motor although any type of suitable motor may be employed. A worm drive/worm gear assembly may be employed to permit motor 160 to rotate rotating collar 124.

Figure 3:
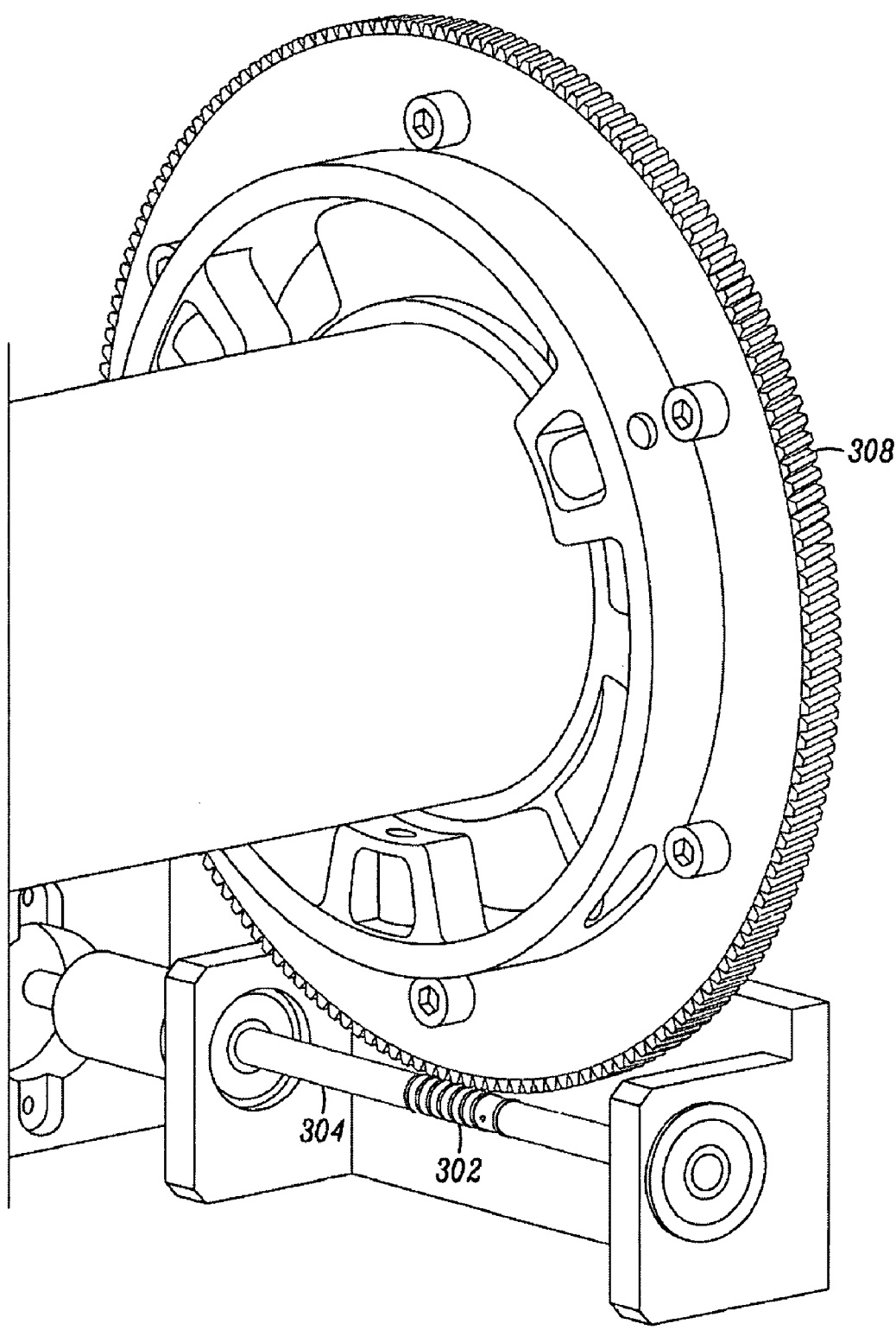
FIG. 3 shows, in accordance with an embodiment of the invention, the relative positions of the eared flanges and the tangs prior to coupling.

FIG. 3 shows worm drive 302 having gear disposed on shaft 304 of motor 160. Worm gear 308 is shown coupled to the periphery of the rotating collar. When shaft 304 rotates, worm drive 302 rotates worm gear 308 accordingly. The gearing ratio may be anywhere from 1:1 to thousands:1 as desired to provide adequate control and compression force to compress the O-ring seal in order to create and maintain the desired vacuum seal. The worm drive/worm gear combination is advantageous in being able to generate the high compression force required to compress, for example, one-time metallic O-ring seals. However, that other suitable types of gearing mechanism may also be employed if suitable for a specific application. Likewise, although a servo motor/worm drive/worm gear combination is employed to rotate rotating collar, other methods for rotating the rotating collar (including for example an) suitable type of hydraulic or electric actuator) may also be employed.

Figure 4:
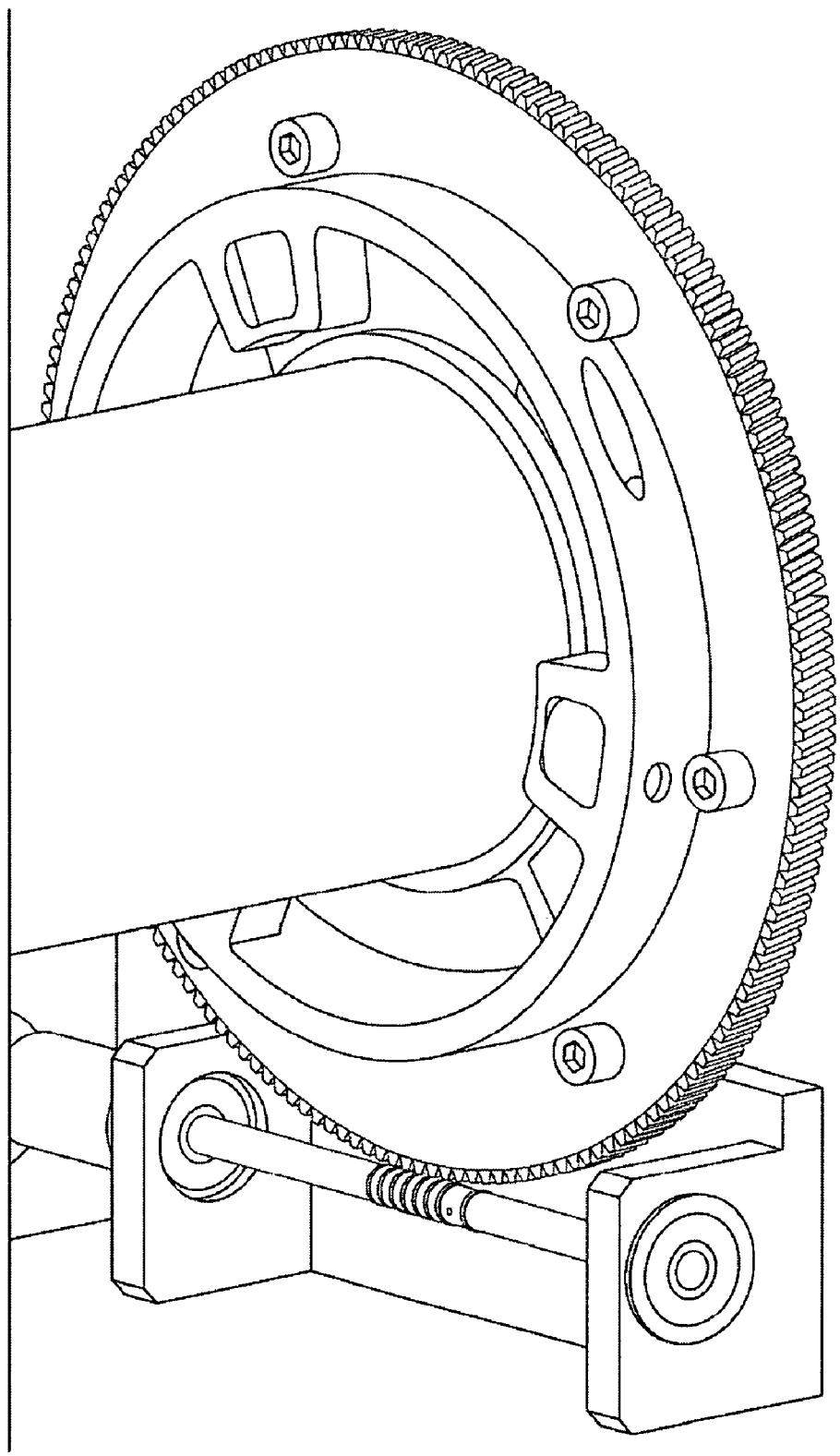
FIG. 4 shows, in accordance with an embodiment of the invention, the relative positions of the eared flanges and the tangs after coupling.

FIG. 3 also shows the eared flanges as they are mated through the inter-tang spacings and prior to being cammed against the tangs of the rotating collar. In FIG. 3, the tapered ramp surfaces of the eared flanges are not yet cammed against the tapered needle bearings of the tangs of the rotating collar. In FIG. 4, the rotating collar has been rotated counter-clockwise from the position it occupies in FIG. 3. Thus the tapered ramp surfaces of the eared flanges are now pressed against the needle bearings of the tangs of the rotating collar, thereby urging the light source face seal surface against the scanner mating seal surface. Although the gears are shown exposed to facilitate discussion in the example of FIGS. 3 and 4, the gears may be housed in an enclosure for safety. FIG. 1 shows such an enclosure 180.

As can be appreciated from the foregoing, embodiments of the invention facilitate blind-mate self-centering alignment and coupling of the light source subsystem and the scanner subsystem of the UV lithography system. The use of the tapered ramp eared flanges and corresponding tangs generates a camming force to urge the two subsystems together when the rotating collar (on which the tangs are disposed) rotates. Since the rotational force is provided by a motor through an appropriate gear assembly, manual access to the interface region is no longer required. Accordingly, space requirement may be reduced in the design of the UV lithography system, particular with respect to space allotment for prior art manual access by the human assembler. Further, the use of a tapered lead-in stub provides a self-centering capability, both angularly and linearly, to render the alignment process substantially automatic during coupling. Since manual human alignment and coupling is no longer required, the assembly process is more consistent and less dependent upon the skills of the particular human technician who happens to be assigned the assembly task.

While this invention has been described in terms of several preferred embodiments, there are alterations, permutations, and equivalents, which fall within the scope of this invention. Although various examples are provided herein, it is intended that these examples be illustrative and not limiting with respect to the invention.

For example, although a tapered cone is shown with the lead-in stub, the lead-in stub may employ a sphere for self-centering purposes. As another example, although three eared flanges are shown in the illustrated example, the number of eared flanges and corresponding cared tangs may be increased as required (e.g., to provide a higher compression force). As another example, although the bearings employed with the tangs of the rotating collar are needle bearings in the illustrated example, other pressure bearing mechanisms (such as roller bearings, ball bearings, etc.) mad also be employed. As another example, although a servo motor/worm drive/worm gear combination is employed to rotate the rotating collar, another suitable actuator (such as a linear actuator or a hydraulic actuator) may be employed.

As yet another example, although the example discussed herein employs an elastomeric seal or a metallic seal, an alternative sealing arrangement may be employed. An example of such an alternative sealing arrangement is the use of two concentric o-rings sealing against the same face with the region between the o-rings ported and pumped via a rough vacuum pump, thereby providing a pressure differential on both sides of the inner ring. As yet another example, the collar may be stationary while the ear flanges are rotated by an appropriate actuator assembly to facilitate the blind motorized alignment and coupling.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A UV lithography system, comprising:
a light source subsystem comprising a light source output tube;
a scanner subsystem; and
a coupling arrangement for coupling said light source subsystem with said scanner subsystem, comprising:
a source flange having a plurality of radially outwardly projecting eared flanges disposed around a periphery of said source flange and coupled to one of said light source output tube and said scanner subsystem,
a collar coupled with the other of said light source output tube and said scanner subsystem, said collar having a plurality of radially inwardly projecting tangs disposed around a periphery of said collar such that inter-tang spacings accommodate insertion of said plurality of eared flanges, wherein at least one of said source flange and said collar is rotatable to permit said plurality of ramped eared flanges to cam against said plurality of tangs, thereby coupling said light source subsystem to said scanner subsystem, and
a lead-in stub coupled with said other of said light source output tube and said scanner subsystem, said lead-in stub configured to fit in a recess disposed within an end of said one of said light source output tube and said scanner subsystem to facilitate blind-mate self-centering when said light source subsystem is brought together with said scanner subsystem, wherein said is disposed through a center of said collar and axially protrudes beyond a plane formed by said plurality of tangs.

2. The coupling arrangement of claim 1 further comprising a tapered cone coupled to said lead-in stub.

3. The coupling arrangement of claim 1 wherein said source flange is disposed on said light source output tube.

4. The coupling arrangement of claim 1 wherein said collar is rotatable.

5. The coupling arrangement of claim 1 further comprising means for rotating said one of said source flange and said collar.

6. The coupling arrangement of claim 5 wherein said means for rotating includes a stepper motor.

7. The coupling arrangement of claim 1 further comprising a plurality of bearings coupled to said plurality of tangs, said plurality of ramped eared flanges riding on said plurality of bearings when said one of said source flange and said collar is rotated, wherein said plurality of bearings represent one of a plurality of needle bearings, a plurality of roller bearings, and a plurality of ball bearings.

8. A UV lithography system, comprising:
a light source subsystem;
a scanner subsystem; and
a coupling arrangement for coupling said light source subsystem with said scanner subsystem, comprising:

a light source output tube coupled to said light source subsystem, said light source output tube including a source flange having a plurality of radially outwardly projecting eared flanges disposed around a periphery of said source flange, a collar coupled to said scanner subsystem, said collar having a plurality of radially inwardly projecting tangs disposed around a periphery of said collar such that inter-tang spacings accommodate insertion of said plurality of eared flanges, wherein at least one of said source flange and said collar is rotatable to permit said plurality of ramped eared flanges to cam against said plurality of tangs, thereby coupling said light source subsystem to said scanner subsystem, and a lead-in stub coupled with said scanner subsystem, said lead-in stub configured to fit in a recess disposed within an end of said light source output tube to facilitate blind-mate self-centering when said light source subsystem is brought together with said scanner subsystem, wherein is disposed through a center of said collar and axially protrudes beyond a plane formed by said plurality of tangs.

9. The coupling arrangement of claim 8 further comprising a tapered cone coupled to said lead-in stub.

10. The coupling arrangement of claim 8 further comprising means for rotating said collar.

11. The coupling arrangement of claim 10 wherein said means for rotating includes a stepper motor.

12. The coupling arrangement of claim 8 further comprising a plurality of bearings coupled to said plurality of tangs, said plurality of ramped eared flanges riding on said plurality of bearings when said collar is rotated.

13. The coupling arrangement of claim 8 further comprising a light source face seal surface disposed at an end of said light source output tube, said light source face seal surface configured to accommodate an o-ring designed to be trapped between said light source face seal surface and said scanner subsystem after said coupling.

* * * * *